US 6,747,088 B1

(12) United States Patent
Schwalm et al.

(10) Patent No.: US 6,747,088 B1
(45) Date of Patent: Jun. 8, 2004

(54) AQUEOUS POLYURETHANE DISPERSIONS WHICH CAN BE HARDENED WITH MIT UV-RADIATION AND THERMALLY, AND USE THEREOF

(75) Inventors: Reinhold Schwalm, Wachenheim (DE); Wolfgang Paulus, Ober-Olm (DE); Uwe Meisenburg, Duisburg (DE); Erich Beck, Ladenburg (DE); Bernd Bruchmann, Freinsheim (DE); Wolfgang Schrof, Neuleiningen (DE); Frank Völlinger, Edenkoben (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 253 days.

(21) Appl. No.: 10/088,520

(22) PCT Filed: Sep. 29, 2000

(86) PCT No.: PCT/EP00/09559

§ 371 (c)(1),
(2), (4) Date: Mar. 29, 2002

(87) PCT Pub. No.: WO01/23453

PCT Pub. Date: Apr. 5, 2001

(30) Foreign Application Priority Data

Sep. 30, 1999 (DE) .......................................... 199 47 054
Jul. 12, 2000 (DE) .......................................... 100 33 697

(51) Int. Cl.[7] ............................. C08J 3/00; C08J 3/28; C08K 3/20; C08L 75/00; B05D 3/02
(52) U.S. Cl. .................. 524/507; 427/372.2; 427/385.5; 522/90; 522/96; 522/97; 522/98; 524/591; 524/839; 524/840; 525/123; 525/127; 525/124; 525/455; 428/423.1
(58) Field of Search ................. 524/507, 591, 524/839, 840; 525/123, 124, 127, 455; 522/90, 96, 97, 98; 427/372.2, 385.5; 428/423.1

(56) References Cited

U.S. PATENT DOCUMENTS 5,296,529 A  3/1994  Yukawa et al.
5,859,135 A  1/1999  Doomen et al.

FOREIGN PATENT DOCUMENTS

| CA | 2 159 265 | 3/1996 |
| DE | 198 60 041 | 12/1998 |
| DE | 198 60 041 | 6/2000 |
| EP | 0 098 752 | 1/1984 |
| EP | 0 902 040 | 3/1999 |
| FR | 2 607 820 | 6/1988 |

Primary Examiner—Patrick D. Niland
(74) Attorney, Agent, or Firm—Oblon, Spivak, McClelland, Maier & Neustadt, P.C.

(57) ABSTRACT

UV- and heat-curable aqueous polyurethane dispersions comprise compounds attached via polyisocyanates and containing UV-polymerizable C=C double bonds, aliphatic diols incorporated by way of isocyanates and having a molecular weight of less than 500 g/mol, compounds attached via isocyanates and containing carboxylic acid or sulfonic acid groups and/or salts thereof, free hydroxyl groups, and compounds containing blocked isocyanate groups. They are suitable for coating heat-stable substrates such as metal substrates and may be used with advantage for automotive clearcoats.

22 Claims, No Drawings

AQUEOUS POLYURETHANE DISPERSIONS WHICH CAN BE HARDENED WITH MIT UV-RADIATION AND THERMALLY, AND USE THEREOF

The invention relates to UV- and heat-curable polyurethane dispersions which have UV-polymerizable C=C double bonds, hydroxyl groups and blocked isocyanate groups in one molecule or the blocked isocyanate groups in admixed compounds, and to processes for their preparation and use.

Radiation-curable polyurethane dispersions are known, for example, from the Applicant's DE-A 4434554 and are prepared from polyisocyanates, hydroxyl-containing polyesters, compounds containing an isocyanate-reactive group and an acid group, and compounds containing an isocyanate-reactive group and C=C double bonds. In terms of their processing properties, however, the products leave a certain amount to be desired. U.S. Pat. No. 5,859,135 describes aqueous coating mixtures comprising a lipophilic polymer containing at least one hydroxyl group, having a molecular weight of up to 100,000, which is connected on one side to a crosslinkable functional group and on the other side, via a polyisocyanate, to a group containing carboxyl groups and to a hydrophilic polyalkylene oxide monoether radical.

A disadvantage is that coatings produced therewith have a relatively high intrinsic hydrophilicity, even after processing. U.S. Pat. No. 5,296,529 describes a self-crosslinking resin containing carboxyl, hydroxyl, and blocked isocyanate groups, which is prepared from a) a copolymer of a vinyl monomer containing free and blocked isocyanate groups with a styrene and/or (meth)acrylate comonomer, and b) a polyester resin containing hydroxyl and carboxyl groups, some hydroxyl groups of the polyester resin being reacted with some free isocyanate groups of the vinyl copolymer, and remaining isocyanate groups then being blocked. It can be seen that a highly reproducible production of the system counters the risk of a premature unwanted crosslinking of the two polymers. Also, the system described contains no UV-curable double bonds, nor is any radiation curing thereof described.

DE-A-198 60 041 describes reaction products of a) polyisocyanates and b) low molecular mass hydroxy compounds containing C=C double bonds, such as hydroxyalkyl(meth)acrylates or hydroxyalkyl vinyl ethers, the majority of which constitute allophanates of the polyisocyanates with the unsaturated alcohols. The low molecular mass reaction products, which are of low viscosity, have a high polymerizable C=C double bond content in the molecule and can be both polymerized with UV radiation and cured thermally, with the participation of the isocyanate groups, or by exposure to water vapor, ammonia, or amines. An application in the form of aqueous dispersions is not described.

It is an object of the present invention to prepare both UV- and heat-curable aqueous polyurethane dispersions which give rise to coatings having good chemical resistance and good mechanical properties, in particular a high scratch resistance, which dry physically after treatment even at unexposed areas, and are suitable for exterior applications such as for an automobile finish.

We have found that this object is achieved with polyurethane dispersions synthesized essentially from a) aliphatic polyisocyanates having an NCO functionality of from 2 to 4.5, b) compounds containing at least one isocyanate-reactive group and at least one UV-polymerizable C=C double bond, c) aliphatic and/or cycloaliphatic compounds containing at least two hydroxyl, mercapto and/or primary and/or secondary amino groups, having a molecular weight of less than 500 g/mol, d) compounds containing at least one isocyanate-reactive group and also at least one carboxyl group or sulfonic acid group, e) at least one basic compound for full or partial neutralization of the acid groups of the compounds d), f) an isocyanate blocking agent (f1) which converts isocyanate groups into blocked isocyanate groups with an unblocking temperature in the range from 70 to 160° C., or addition of a compound (f2) containing blocked isocyanate groups, and g) if desired, a compound different than compounds b) to f) which contains only one isocyanate-reactive group, the reaction products of a) with b) and, if appropriate, c), prepared with a stoichiometric excess of NCO groups in relation to the OH groups, having been reacted with compounds d) and e) in amounts sufficient for dispersibility in aqueous medium, isocyanate groups having been converted into blocked isocyanate groups by reaction with isocyanate blocking agents (f1), or compounds containing blocked isocyanate groups (f2) having been added.

The building blocks of the polyurethane dispersion:

Component a)

Aliphatic polyisocyanates a) having an NCO functionality of from 2 to 4.5 and preferably from 2.0 to 3.5 include especially, as aliphatic (including cycloaliphatic) diisocyanates, hexamethylene diisocyanate, 1,3- and 1,4-bis(isocyanatomethyl)cyclohexane, isophorone diisocyanate, and di(isocyanatocyclohexyl)methane. Preference is given to polyisocyanates having a functionality of at least 3, such as polyisocyanates containing isocyanurate groups, biuret groups, uretdione groups or urethane groups and/or allophanate groups. The polyisocyanates containing isocyanurate groups comprise, in particular, simple trisisocyanato isocyanurates, which constitute cyclic trimers of the diisocyanates, or mixtures thereof with their higher homologs containing more than one isocyanurate ring. The isocyanato isocyanurates generally have an NCO content of from 10 to 30, in particular from 15 to 25% by weight, and an average NCO functionality of 3 to 4.5. Polyisocyanates containing biuret groups are adducts of 3 molecules of diisocyanate with 1 molecule of water and have in particular an NCO content from 18 to 22% by weight and an average NCO functionality of from 3 to 4.5. Polyisocyanates containing urethane groups and/or allophanate groups may be obtained, for example, by reacting excess amounts of diisocyanate with simple alcohols such as trimethylolpropane, glycerol, 1,2-dihydroxypropane or mixtures thereof, for example, and generally have an NCO content of from 12 to 20% by weight and an average NCO functionality of from 2.5 to 3. Polyisocyanates having an NCO functionality of more than 2 that may be mentioned also include the adducts of 3 mol of diisocyanates such as isophorone diisocyanate with trihydric alcohols such as trimethylolpropane.

The component a) preferably comprises at least one compound Va) having two free isocyanate groups, at least one allophanate group, and at least one free-radically polymerizable C=C double bond, a carbonyl group or an oxygen atom in ether function being attached directly to the double bond.

The compound Va) is preferably selected from compounds of the formula I

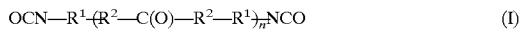

OCN—R$^1$-(R$^2$—C(O)—R$^2$—R$^1$)$_n$—NCO  (I)

where
n is an integer from 1 to 10,
R$^1$ is a divalent aliphatic or alicyclic C$_2$ to C$_{20}$ hydrocarbon unit or an aromatic C$_6$ to C$_{20}$ hydrocarbon unit,
R$^2$ in each repeating unit is once —NH— and once

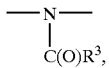

—N—
   |
   C(O)R$^3$,

R$^3$ being a radical derived from an alcohol A by abstracting the hydrogen atom from the alcoholic hydroxyl group, said alcohol A further comprising at least one free-radically polymerizable C═C double bond, and a carbonyl group or an oxygen atom in ether attachment being attached directly to the double bond.

The radicals R$^1$ preferably comprise those derived by abstracting the isocyanate group from customary aliphatic or aromatic polyisocyanates. The diisocyanates are preferably aliphatic isocyanates having 4 to 20 carbon atoms. Examples of customary diisocyanates are aliphatic diisocyanates such as tetramethylene diisocyanate, hexylmethylene diisocyanate, octamethylene diisocyanate, decamethylene diisocyanate, dodecamethylene diisocyanate, tetradecamethylene diisocyanate, derivatives of lysine diisocyanate, tetramethylxylylene diisocyanate, cycloaliphatic diisocyanates such as 1,4-, 1,3- or 1,2-diisocyanatocyclohexane, 4,4'- or 2,4'-di(isocyanatocyclohexyl)methane, isophorone diisocyanate, 1,3- or 1,4-bis(isocyanatomethyl)cyclohexane, 2,4- and 2,6-diisocyanato-1-methylcyclohexane, and also aromatic diisocyanates such as 2,4- or 2,6-tolylene diisocyanate, m- or p-xylylene diisocyanate, 2,4'- or 4,4'-diisocyanatodiphenylmethane, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethyldiphenyl diisocyanate, 3-methyldiphenylmethane 4,4'-diisocyanate, and diphenyl ether 4,4'-diisocyanate. Mixtures of the abovementioned diisocyanates may be present. Preference is given to hexamethylene diisocyanate, 1,3-bis(isocyanatomethyl)cyclohexane, isophorone diisocyanate, tetram thylxylylene diisocyanate, and di(isocyanatocyclohexyl)methane.

The alcohols A from which the radical R$^3$ is derived comprise, for example, esters of α,β-unsaturated carboxylic acids, such as acrylic acid, methacrylic acid (below for short "(meth)acrylic acid"), crotonic acid, acrylamidoglycolic acid, methacrylamidoglycolic acid or vinylacetic acid and polyols having preferably 2 to 20 carbon atoms and at least 2 hydroxyl groups, such as ethylene glycol, diethylene glycol, triethylene glycol, 1,2-propylene glycol, 1,3-propylene glycol, dipropylene glycol, tripropylene glycol, 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, glycerol, trimethylolethane, trimethylolpropane, trimethylolbutane, penta-erythritol, ditrimethylolpropane, erythritol and sorbitol, provided the ester has at least one isocyanate-reactive OH group. The radicals R$^3$ may also be derived from the amides of (meth)-acrylic acid with amino alcohols, e.g. 2-aminoethanol, 3-amino-1-propanol, 1-amino-2-propanol or 2-(2-aminoethoxy)-ethanol, and the vinyl ethers of the abovementioned polyols, provided they still have one free OH group.

Also suitable as reactive components, furthermore, are unsaturated polyetherols or polyesterols or polyacrylate polyols having an average OH functionality of from 2 to 10.

The radicals R$^3$ are preferably derived from alcohols such as 2-hydroxyethyl(meth)acrylate, hydroxypropyl(meth)acrylate, 1,4-butanediol mono(meth)acrylate, neopentyl glycol mono(meth)acrylate, glycerol mono- and di(meth)acrylate, trimethylolpropane mono- and di(meth)acrylate, and penta-erythritol di- and tri(meth)acrylate. With particular preference, the alcohol A is selected from 2-hydroxyethyl acrylate, 2-hydroxyethyl methacrylate and hydroxypropyl (meth)acrylate. Examples of amides of ethylenically unsaturated carboxylic acids with amino alcohols are hydroxyalkyl(meth)acrylamides such as N-hydroxymethyl(meth)acrylamide, N-hydroxyethyl(meth)acrylamide, 5-hydroxy-3-oxopentyl(meth)acrylamide, N-hydroxyalkylcrotonamides such as N-hydroxymethylcrotonamide or N-hydroxyalkylmaleimides such as N-hydroxyethylmaleimide.

In particular the component a) comprises at least one compound Va) and at least one further, different aliphatic or araliphatic polyisocyanate. Preferred further polyisocyanates are polyisocyanates having an NCO functionality of from 2 to 4.5, with particular preference from 2 to 3.5. It is preferred to use aliphatic, cycloaliphatic, and araliphatic diisocyanates. These include, for example, tetramethylene diisocyanate, hexamethylene diisocyanate, 2,3,3-trimethylhexamethylene diisocyanate, 1,4-cyclohexylene diisocyanate, isophorone diisocyanate, 1,3- and 1,4-bis(isocyanatomethyl)cyclohexane, di(isocyanatocyclohexyl)methane, tetramethylxylylene diisocyanate, and mixtures thereof. Preference is given to polyisocyanates containing not only two or more isocyanate groups but also a group selected from the group of the urethane, urea, biuret, allophanate, carbodiimide, uretonimine, uretdione, and isocyanurate groups. Preferred additional polyisocyanates are isophorone diisocyanate, 1,3- and 1,4-bis(isocyanatomethyl)cyclohexane, their isocyanurates, biurets and allophanates, and mixtures thereof.

Particularly preferred polyisocyanate starting materials for preparing the curable polyurethane dispersions of the invention are allophanate-group-containing polyisocyanates of hexamethylene diisocyanate or of isophorone diisocyanate with the hydroxy compounds b) containing C═C groups, as described in DE-A-198 60 041, and especially the corresponding reaction products of the polyisocyanates with the hydroxyalkyl (meth)acrylates.

Component b)

The compounds of component b) generally contain a free-radically polymerizable C═C double bond and also at least one other isocyanate-reactive group. Examples of preferred compounds of components b) are the monoesters of dihydric or polyhydric alcohols with α,β-ethylenically unsaturated mono- and/or dicarboxylic acids and their anhydrides. α,β-Ethylenically unsaturated mono- and/or dicarboxylic acids and their anhydrides which may be used include, for example, acrylic acid, methacrylic acid, fumaric acid, maleic acid, maleic anhydride, crotonic acid, itaconic acid, etc. It is preferred to use acrylic acid and methacrylic acid. Examples of suitable alcohols are diols such as glycols, preferably glycols of 2 up to 25 carbon atoms, such as 1,2-ethanediol, 1,3-propanediol, 1,4-butanediol, 1,3-butanediol, 1,5-pentanediol, 1,4-pentanediol, 1,6-hexanediol, 1,10-decanediol, diethylene glycol, etc. Suitable triols and polyols have, for example, 3 to 25, preferably 3 to 18, carbon atoms. Examples include glycerol, trimethylolpropane, erythritol, pentaerythritol, sorbitol, etc.

The compounds of component b) are selected preferably from 2-hydroxyethyl acrylate, 2-hydroxyethyl methacrylate, 2-hydroxypropyl acrylate, 2-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, trimethylolpropane monoacrylate and mixtures thereof. If desired, these compounds may also have been chain-extended by reaction with an appropriate chain extender, such as a polyfunctional isocyanate or a polyfunctional carboxylic acid, for example.

Further suitable compounds b) are the esters and amides of amino alcohols with the abovementioned $\alpha,\beta$-ethylenically unsaturated mono- and/or dicarboxylic acids, hydroxyalkyl vinyl ethers such as hydroxybutyl vinyl ether, etc.

Particularly suitable compounds b) containing at least one isocyanate-reactive group and also at least one C=C double bond polymerizable with UV radiation in the presence of a photoinitiator are methacrylic monoesters and acrylic monoesters of aliphatic diols and also methacrylamides and acrylamides of amino alcohols, and, furthermore, hydroxyalkyl vinyl ethers such as hydroxybutyl vinyl ether, of which preference is given to hydroxyalkyl acrylates having 2 to 4 carbon atoms in the alkyl radical, such as 2-hydroxyethyl acrylate, where the adjacent carbonyl group or ether group contributes to activating the C=C double bond.

Component c)

For the preparation of the polyurethane it is advantageous to use further aliphatic compounds c) containing at least two isocyanate-reactive hydroxyl, mercapto and/or amino groups and having a molecular weight of less than 500 g/mol. Particularly suitable such compounds are hydrolytically stable short-chain diols such as dihydroxymethylcyclohexane, bis(hydroxycyclohexyl)-propane, tetramethylcyclobutanediol, cyclooctanediol, or norbornanediol. Preference is given to the use of hydrocarbon diols having a C number of from 6 to 20, such as hexanediol, octanediol, decanediol, or dodecanediol.

The additional use of polyfunctional alcohols, amino alcohols or thio alcohols may also serve, however, to introduce isocyanate-reactive functional groups prior to final curing, if the stoichiometry is chosen so that statistically only a few of the isocyanate-reactive groups react in reactions prior to final curing. To accelerate the reaction of the polyisocyanates it is possible to use the customary catalysts such as dibutyltin dilaurate, tin(II) octoate, or diazabicyclo[2.2.2]octane. In the preparation of allophanates of the polyisocyanates with the unsaturated alcohols at temperatures of from 20 to 280° C., the presence of catalysts which promote allophanate formation is advantageous, such as organozinc compounds or tetraalkylammonium compounds. Regarding the preparation of the allophanates, reference may be made again to the remarks in DE-A-198 60 041.

Component d)

Particularly suitable compounds d) containing at least one isocyanate-reactive group and also at least one carboxylic acid or sulfonic acid group are aliphatic monomercapto-, monohydroxy- and monoamino- and iminocarboxylic acids and corresponding sulfonic acids, such as mercaptoacetic acid (thioglycolic acid), mercaptopropionic acid, mercaptosuccinic acid, hydroxyacetic acid, hydroxypivalic acid, dimethylolpropionic acid, hydroxydecanoic acid, hydroxydodecanoic acid, 12-hydroxystearic acid, hydroxyethanesulfonic acid, hydroxypropanesulfonic acid, mercaptoethanesulfonic acid, mercaptopropanesulfonic acid, aminopropanesulfonic acid, glycine (aminoacetic acid), or iminodiacetic acid.

Component e)

Suitable basic compounds e) for full or partial neutralization of the acid groups of the compounds include organic and inorganic bases such as alkali metal and alkaline earth metal hydroxides, oxides, carbonates, hydrogen carbonates, and also ammonia or primary, secondary, or tertiary amines. Preference is given to full or partial neutralization with amines such as with ethanolamine or diethanolamine and in particular with tertiary amines, such as triethylamine, triethanolamine, dimethylethanolamine, or diethylethanolamine. The amounts of chemically bonded acid groups introduced and the extent of the neutralization of the acid groups (which is usually from 40 to 100% of the equivalence basis) should be sufficient to ensure dispersion of the polyurethanes in an aqueous medium, as is familiar to the skilled worker.

Component f)

Suitable blocking agents for isocyanate groups (f1) are compounds which convert the isocyanate groups into blocked isocyanate groups which subsequently below their unblocking temperature do not exhibit the customary reactions of a free isocyanate group. When the blocked isocyanate groups are heated to a temperature which corresponds at least to the unblocking temperature, which for the purposes of this invention is to be situated within the range from 70 to 160° C., the isocyanate groups are exposed again and are available for customary isocyanate reactions, for example, for reactions with functional groups such as hydroxyl, mercapto, or amino groups, for example. Compounds which block (cap, mask or protect) the isocyanate groups have been widely described in the literature (cf., e.g., Z. W. Wicks, Prog. Org. Coat. 3(1975) 73–99 and also 9(1981) 3–28 or Houben-Weyl, Methoden der Organischen Chemie Vol. XIV/2, p. 61 ff., Georg Thieme Verlag, Stuttgart 1963). Typical blocking agents of isocyanate groups (f1) are phenols, caprolactam, imidazoles, pyrazoles, pyrazolinones, 1,2,4-triazoles, diketopiperazines, malonates, and oximes. Preference is given to oximes such as 2-butanone oxime, 3,5-dimethylpyrazole, and 1,2,4-triazoles. Instead of blocking isocyanate groups in the same molecule with the blocking agent, which is preferred, an alternative is to admix to the polyurethane a low molecular mass compound containing blocked isocyanate groups (f2), which subsequently, in the course of curing, with heating to at least the unblocking temperature, exposes reactive isocyanate groups and is available for the curing or crosslinking reaction. It is also possible to use mixtures of isocyanate blocking agents having different unblocking temperatures within the aforementioned range.

Component g)

Finally, it is possible to use compounds g) which are different than the compounds b) to f) and have only one isocyanate-reactive group, in order, for example, to modify the properties of the polyurethane and/or to reduce the number of reactive free isocyanate groups.

In order to modify the polyurethane dispersions of the invention they may be admixed conventionally with reactive diluents, as described in P.K.T. Oldring (Editor), Chemistry & Technology of UV & EB Formulations for Coatings, Inks & Paints, Vol. II, Chapter III: Reactive Diluents for UV & EB Curable Formulations, Wiley and SITA Technology, London 1997. In accordance with a first embodiment, the reactive diluents are to contain no hydroxyl groups. Preferred reactive diluents are esters of acrylic acid which are derived from diols or polyols, preferably aliphatic polyhydric polyalcohols and alkoxylation products thereof. Examples of very suitable reactive diluents which may also be used for a further increase in hardness of the coatings produced with the polyurethane dispersions are, for example, trimethylolethane tri(meth)acrylate, trimethylolpropane tri(meth)acrylate, or pentaerythritol tetra(meth)acrylate. Preference is also given to hexanediol diacrylate, hexanediol dimethacrylate, octanediol diacrylate, octanediol dimethacrylate, nonanediol diacrylate, nonanediol dimethacrylate, decanediol diacrylate, and decanediol dimethacrylate. Further suitable compounds are the esters of alicyclic diols, such as cyclohexanediol di(meth)acrylate and bis(hydroxymethylethyl)cyclohexane di(meth)acrylate. Other suitable reactive diluents include trimethylolpropane monoformal acrylate, glycerol formal acrylate, 4-tetrahydropyranyl acrylate, 2-tetrahydropyranyl methacrylate and tetrahydrofurfuryl acrylate.

In accordance with another embodiment, the reactive diluents have at least two functional groups, selected from free-radically polymerizable double bonds and isocyanate-reactive groups. They include, on the one hand, polymeric polyols other than component c). The number-average molecular weight $M_n$ of these polymers is preferably situated within a range from about 1000 to 100,000, with particular preference from 2000 to 10,000. The OH numbers are preferably within a range from about 40 to 200 mg KOH/g polymer. Preferred polymers are, for example, copolymers containing in copolymerized form at least one of the abovementioned monoesters of dihydric or polyhydric alcohols with at least one α,β-ethylenically unsaturated mono- and/or dicarboxylic acid and at least one further comonomer selected preferably from vinylaromatic compounds, such as styrene, for example, esters of the abovementioned α,β-unsaturated mono- and/or dicarboxylic acids with monoalcohols, vinyl esters of carboxylic acids containing up to 20 carbon atoms, vinyl halides, nonaromatic hydrocarbons having 4 to 8 carbon atoms and 1 or 2 double bonds, unsaturated nitrites, etc., and mixtures thereof. They further include (partially) hydrolyzed vinyl ester polymers, preferably polyvinyl acetates. They additionally include polyesterols based on aliphatic, cycloaliphatic and/or aromatic di-, tri- and/or polycarboxylic acids with di-, tri- and/or polyols and also lactone-based polyesterols. They additionally include polyetherols obtainable by polymerizing cyclic ethers or by reacting alkylene oxides with a starter molecule, and also α,ω-diamino polyethers obtainable by reacting polyetherols with ammonia. Moreover, they also include customary polycarbonates known to the skilled worker and containing terminal hydroxyl groups, which are obtainable, for example, by reacting the aforementioned diols with phosgene or carbonic diesters.

Suitable reactive diluents containing at least one free-radically polymerizable C=C double bond and at least one isocyanate-reactive group are the esters and polyesters of the aforementioned α,β-ethylenically unsaturated mono- and/or dicarboxylic acids with diols or polyols that still contain free hydroxyl groups. They include, for example, pentaerythritol diacrylate, dipentaerythritol tetraacrylate, dipentaerythritol triacrylate, etc. Also suitable are the esters, again still containing free hydroxyl groups, of alkoxylated polyols with α,β-ethylenically unsaturated mono- and/or dicarboxylic acids, such as the acrylates or methacrylates of alkoxylated trimethylolpropane, glycerol, or pentaerythritol, for example.

The coating compositions of the invention may be prepared from the individual components described and by the above instructions in accordance with techniques customary to the skilled worker, possibly using known coating additives, such as leveling agents, defoamers, UV absorbers, dyes, pigments and/or fillers.

The polyurethane content of the aqueous dispersions may be in particular between 5 and 70 and in particular between 20 and 50% by weight, the solids content being determined gravimetrically.

Prior to the curing of the polyurethane dispersions with UV radiation, it is advantageous to add to them photoinitiators in an amount of from 0.01 up to 10 and preferably from 1 to 5% by weight, based on the solids content of the dispersion, these photoinitiators being as specified in Patent Application DE-A-198 60 041.

Examples hereof include benzophenone and benzophenone derivatives, such as 4-phenylbenzophenone and 4-chlorobenzophenone, Michler's ketone, acetophenone derivatives, such as 1-benzoylcyclohexan-1-ol, 2-hydroxy-2,2-dimethylacetophenone, and 2,2-dimethoxy-2-phenylacetophenone, benzoin and benzoin ethers, such as methyl, ethyl and butylbenzoin ethers, benzil ketals, such as benzil dimethyl ketal, 2-methyl-1-[4-(methylthio)phenyl]-2-morpholinopropan-1-one, anthraquinone and its derivatives, such as methylanthraquinone and tert-butylanthraquinone, acylphosphine oxides, such as 2,4,6-trimethylbenzoyldiphenylphosphine oxide, ethyl 2,4,6-trimethylbenzoylphenylphosphinate, methyl 2,4,6-trimethylbenzoylphenylphosphinate and bisacylphosphine oxides.

For particular preference the dispersions of the invention include at least one photoinitiator selected from phenylglyoxalic acid and the esters and salts thereof. Particular preference is given to compounds of the formula I

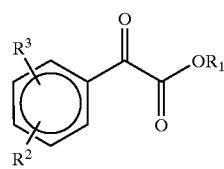

I $R^1$ is a hydrogen atom or a $C_1$–$C_{18}$ alkyl group. Preferably, $R^1$ is a $C_1$–$C_8$ alkyl group, especially methyl, ethyl, propyl, butyl, or hexyl.

$R^2$ and $R^3$ independently of one another are a hydrogen atom or a $C_1$–$C_{18}$ alkyl or $C_1$–$C_{18}$ alkoxy group.

Preferably $R^2$ and $R^3$ independently of one another are a hydrogen atom.

Where at least one of the two radicals $R^2$ and $R^3$ is other than a hydrogen atom, the phenyl ring is substituted preferably para (in position 4) to the carbonyl group.

Particular preference is also given to phenylglyoxalic esters of the formula II

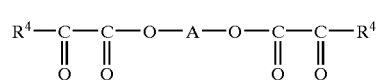

II where the two radicals $R^4$ independently of one another are a radical of the formula

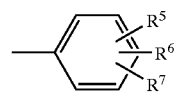

$R^5$, RS and $R^7$ independently of one another are H, $C_1$–$C_6$ alkyl unsubstituted or substituted by OH, $OC_1$–$C_6$ alkyl or $OCOC_1$–$C_6$ alkyl, or are OH or $OC_1$–$C_6$ alkyl;

A is $C_2-C_6$ alkylene or a radical of the formulae

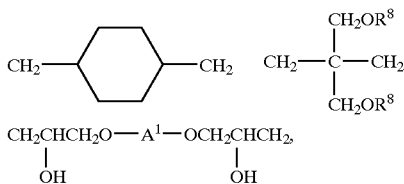

the radicals $R^8$ independently of one another are H or $COCOR^4$, and $A^1$ is $C_2-C_6$ alkylene or

Compounds of this kind are described in DE-A-198 26 712 and German Patent Application P-199 13 353.0, the entirety of which is incorporated here by reference. Preferably, the above-described photoinitiators based on phenylglyoxalic acid derivatives are suitable for exterior applications, since they show little or no yellowing.

In accordance with one suitable embodiment, the dispersions of the invention further comprise at least one thermal initiator. Preferred thermal initiators are those having a half-life at 60° C. of at least one hour, preferably at least two hours. The half-life of a thermal initiator is the time at which half of the initial amount of the initiator has undergone decomposition into free radicals. On a substrate coated with a dispersion of the invention, these initiators generally permit the formation of a film by customary methods, such as evaporation with heating, for example, at which point essentially no thermal initiation and curing yet takes place.

The thermal initiator component is used preferably in an amount of from 0.1 to 10% by weight, more preferably from 0.5 to 5% by weight, based on the total amount of components a) to g).

Suitable thermal initiators are, generally, all compounds which undergo decomposition into free radicals under the curing conditions, such as, for example, peroxides, hydroperoxides, hydrogen peroxides, persulfates, azo compounds, highly substituted—e.g., hexasubstituted—ethanes, amine N-oxides, redox catalysts, etc. Preference is given to the use of water-soluble initiators. Examples of suitable thermal initiators are triphenylmethylazobenzene, benzoyl peroxide, di-tert-butyl peroxide, cumene hydroperoxide, dicumyl peroxide, tert-butyl perbenzoate, 2,2,6,6-tetramethylpiperidin-1-yloxy, benzpinacol and derivatives thereof.

The thermal initiator component further comprises, preferably, at least one thermal initiator containing at least one isocyanate-reactive group, the initiator also being capable, after reaction with a compound containing isocyanate groups, of releasing free radicals under heat. These include, for example, initiators containing at least one bydroxyl group by means of which they may be incorporated into the polymer.

Preference is given to hexasubstituted ethanes, especially benzpinacol and the derivatives thereof, silylated pinacols, available commercially, for example, under the trade name ADDID 600 from Wacker, or hydroxyl-containing amine N-oxides, such as 4-hydroxy-2,2,6,6-tetramethylpiperidin-1-yloxy (TEMPOL).

Preference is given to dispersions in which, of the isocyanate groups of the compounds of component a), from 0 to 70 mol %, preferably from 20 to 60 mol %, have been reacted with isocyanate-reactive groups of at least one compound of component c), and from 2 to 10 mol %, preferably from 4 to 8 mol %, have been reacted with isocyanate-reactive groups of at least one compound of component d).

The remainder of the isocyanate groups, up to 100 mol %, essentially comprise blocked isocyanate groups. The ratio of blocked NCO equivalents to free, NCO-reactive groups is preferably from about 2:1 to 1:2, in particular about 1:1.

DE-A-198 60 041 also describes the implementation of the coating of the substrates, the implementation of the UV curing, which is advantageously effected under an inert gas atmosphere, and the implementation of the thermal (heat) curing, where the addition of peroxide has been found advantageous. The coating techniques specified in German Patent Application DE-A-198 60 041 also apply, mutatis mutandis, to coatings with the polyurethane dispersions of the invention.

The substrates are generally coated by conventional techniques, known to the skilled worker, in which at least one dispersion of the invention is applied in the desired thickness to the target substrate and the volatile constituents of the dispersions are removed. If desired, this procedure may be repeated one or more times. Application to the substrate can be made in a known manner, for example, by spraying, troweling, knifecoating, brushing, rolling, rollercoating or flowcoating. The coating thickness is generally in a range from about 3 to 1000 $g/m^2$ and, preferably, from 10 to 200 $g/m^2$.

In general, the films formed on the substrate are cured by exposure to high-energy radiation, and thermally. The sequence of the curing steps is arbitrary.

If desired, if two or more coats of the coating composition are applied over one another, radiation curing may take place after each coating operation.

Radiation curing takes place preferably by exposure to high-energy radiation, i.e., UV radiation, or daylight, preferably light with a wavelength from 250 to 600 nm, or by bombardment with high-energy electrons (electron beams; from 150 to 300 keV). Examples of the radiation sources used are high-pressure mercury vapor lamps, lasers, pulsed lamps (flashlights), halogen lamps, or excimer emitters. In the case of UV curing, the radiation dose which is usually sufficient for crosslinking is in the range from 80 to 3000 $mJ/cm^2$.

If desired, exposure may also take place in the absence of oxygen, e.g., under an inert gas atmosphere. Suitable inert gases are preferably nitrogen, noble gases, carbon dioxide, or combustion gases. Exposure may also take place with the coating composition covered with transparent media. Examples of transparent media are polymer films, glass, or liquids, e.g., water.

In one preferred technique curing is carried out continuously by passing the substrate, treated with the formulation of the invention, at constant speed past a radiation source. For this technique, the curing rate of the formulation of the invention needs to be sufficiently high.

This difference in the progress of curing over time may be exploited in particular when the coating of the article is followed by another processing step in which the film surface enters into direct contact with another article or is worked mechanically.

The advantage of the dispersions of the invention is that the coated articles may be processed further directly following radiation curing, since the surface no longer sticks. On the other hand, the precured film is still sufficiently flexible and extensible that the article can be deformed without the film flaking or tearing.

Even if deformation of the article is not intended, the technique, known as dual cure, may prove advantageous, because the articles provided with the precured film are particularly easy to transport and store, in stacks, for example. Moreover, the dual cure technique offers the advantage that the coating compositions are able to undergo chemical aftercuring in dark regions (regions unaccessible to radiation) and, consequently, adequate material properties may still be achieved independently of irradiation. Furthermore, spray mist deposits undergo tack-free and emissions-free curing.

The invention additionally provides for the use of a dispersion, as described above, to coat substrates of metal, wood, paper, ceramic, glass, plastic, textile, leather, nonwoven, or mineral building materials.

With particular preference, the dispersions of the invention are suitable as or in exterior coatings, preferably of buildings or parts of buildings, road markings, and coatings on motor vehicles and aircraft.

The polyurethane dispersions of the invention are suitable with particular advantage for coating substrates which can be coated at temperatures up to 160° C., especially metallic substrates such as iron or aluminum. The coating compositions of the invention exhibit particular advantages in connection with their use as automotive clearcoats.

Relative to similar known products, the aqueous polyurethane dispersions prepared in accordance with the invention exhibit high scratch resistance in combination with good chemical resistance, good weathering stability and good mechanical properties, and also good coatings properties in the unexposed regions.

The purpose of the examples which follow is to illustrate the invention, but not restrict it.

EXAMPLES

Unless specified otherwise, parts and percentages are by weight.

The stated contact angles were determined via the contact angle of a drop of water, as described in Adamson, Physical Chemistry of Surfaces, Chapter X, 5th Edition, Wiley, N.Y.

The hardness of the coating was determined as the pencil hardness, as described in organic Coatings, Science and Technology, Vol. 2, p. 128, Wiley, N.Y. 1994. The loss of gloss was determined as specified in Example 2d).

The stated molecular weights were determined by gel permeation chromatography (polystyrene standard, eluent: tetrahydrofuran, UV detection).

Example 1

Preparing a Dual Cure Polyurethane Acrylate Dispersion with Blocked Isocyanate Groups 1a) Preparing the Prepolymer:

A stirred vessel was charged with 455 parts of 2-hydroxyethyl acrylate, 377 parts of 2,2-bis(4-hydroxycyclohexyl)propane, 2.3 parts of 2,6-di-tert-butyl-p-cresol, and 1.2 parts of hydroquinone monomethyl ether, 0.5 part of dibutyltin dilaurate and 1500 parts of the isocyanurate of 1,6-hexamethylene diisocyanate were added, and the mixture was stirred at 60° C. for 5 hours. Subsequently, it was diluted with 500 parts of acetone.

1b) Preparing the Aqueous Polyurethane Dispersion:

150 parts of the prepared solution were admixed with 1.4 parts of thioglycolic acid, 1.6 parts of 2-butanone oxime and 1.8 parts of triethylamine. The mixture was held at 40° C. for 8 hours. It was then dispersed in water and the acetone was removed by distillation.

1c) Preparing and Testing Coating Films:

The aqueous dispersion prepared was admixed with 4% of a mixture of equal parts of benzophenone and 1-hydroxycyclohexyl phenyl ketone as photoinitiator and applied to various substrates in coat thicknesses of approximately 40 $\mu$m. The films were flashed off overnight at room temperature, then heat-treated at 60° C. for 15 minutes and irradiated with two UV lamps (80 W/cm) on a conveyor belt at 10 m/minute. The contact angle was 62°. Subsequently, a coating film was heat-treated at 150° C. for 15 minutes. Result: contact angle 74°; pencil hardness: 2 H. This shows that the hydrophilicity and hardness may be improved by the additional heat treatment. The exposed and heat-treated coating films showed no loss of gloss and no yellowing in the xenon test to DIN 53387 (instrument: Xenotest 1200 from Heraeus, Hanau (DE)) after 1000 hours.

Comparative Experiment 1

The procedure of Example 1 was repeated but adding 1.2 parts of methanol instead of 1.6 parts of 2-butanone oxime during the preparation of the polyurethane dispersion. Following irradiation with UV lamps, the contact angle was 62°; after the subsequent 15 minutes of heat treatment at 150° C., it was 71° and the pencil hardness was 1 H.

Example 2

Preparing a Dual Cure Polyurethane Acrylate Dispersion With Excess OR Groups and Separate Admixture of Blocked Isocyanates 2a) Preparing an Allophanate From Hexamethylene Diisocyanate and 2-Hydroxyethyl Acrylate:

The preparation was as per DE-A-198 60 041, Experimental Section 1.1, Product No. 6. Under nitrogen blanketing, hexamethylene diisocyanate was mixed with 40 mol % (based on the isocyanate) of 2-hydroxyethyl acrylate and the mixture was heated to 80° C. Following the addition of 200 ppm by weight (based on diisocyanate) of N,N,N-trimethyl-N-(2-hydroxypropyl)ammonium 2-ethylhexanoate, the temperature was slowly raised to 120° C. and held at this reaction temperature. When the mixture had an isocyanate content of 13.5% by weight, the reaction was terminated by adding 250 ppm by weight of di(2-ethylhexyl) phosphate (based on diisocyanate). The reaction mixture was then freed from unreacted hexamethylene diisocyanate in a thin-film evaporator at 135° C. and 2.5 mbar. Following distillation, the product had an NCO content of 13.5% by weight and a viscosity of 810 mPas at 23° C.

2b) Preparing the Prepolymer:

A stirred vessel was charged with 26 parts of 2-hydroxyethyl acrylate, 0.2 part of 2,6-di-tert-butyl-p-cresol, and 0.1 part of hydroquinone monomethyl ether. Then 0.02 part of dibutyltin dilaurate and 152 parts of the allophanate prepared as specified above from hexamethylene diisocyanate and 2-hydroxyethyl acrylate were added and the resultant mixture was stirred at 70° C. for 3 hours.

2c) Preparing the Aqueous Polyurethane Dispersion:

Following the addition of 2.6 parts of thioglycolic acid, the mixture was stirred at 70° C. for 3 hours more and cooled. It was diluted with 100 parts of acetone, and 3.5 parts of triethylamine and 23 parts of diethanolamine were added. Subsequently, 50 parts of a 70% strength solution of the reaction product of dimethylpyrazole with the isocyanurate of isophorone diisocyanate, in methyl ethyl ketone, were incorporated by stirring and 200 parts of water were added dropwise over the course of 15 minutes. This gave a stable dispersion having a particle size of 320 nm.

2d) Preparing and Testing Coating Films:

The dispersion prepared as per 2c) was mixed with 3% by weight of the photoinitiator mixture specified in 1c), and this formulation was used to prepare coating films on various substrates in a thickness of approximately 40 μm. The films were aerated overnight at room temperature and then heat-treated at 60° C. for 15 minutes. Thereafter, samples of the films were subjected to different curing conditions in Experiments A1, A2 and A3, namely:

Experiment A1: radiation curing with 2 UV lamps (80 W/cm) on a conveyor belt at 10 m/min;

Experiment A2: curing in a drying oven at 150° C. for 30 minutes;

Experiment A3: radiation curing as A1, then curing as A2.

After curing operations A1 to A3, all films were physically dry and had undergone through-curing (fingernail test).

The scratch resistance was assessed in a scrub test, in which 50 double strokes were performed using a Scotch Brite fabric under a weight of 750 g. The degree of scratching was determined from the measurement of the loss of gloss (before and after scrubbing).

The loss of gloss for experiments A1 to A3 in the Scotch Brite test (50 double strokes) was as follows: A1: 16; A2: 35; A3: 12.

Example 3

Preparing a Dual Cure Polyurethane Acrylate Dispersion with Blocked Isocyanates and OH Groups in Different Molecules 3a) Preparing the Prepolymer:

A stirred vessel was charged with 26 parts of 2-hydroxyethyl acrylate, 0.2 part of 2,6-di-tert-butyl-p-cresol, and 0.1 part of hydroquinone monomethyl ether. 0.02 part of dibutyltin dilaurate and 152 parts of an allophanate of hexamethylene diisocyanate and 2-hydroxyethyl acrylate (prepared as in Example 2a) were admixed and the mixture was stirred at 70° C. for 3 hours.

3b) Preparing the Polyurethane Dispersion:

2.6 parts of thioglycolic acid were added, and the reaction mixture was stirred at 70° C. for 3 hours more and cooled. The mixture was then diluted with 100 parts of acetone, 3.5 parts of triethylamine and 23 parts of diethanolamine were added, and 50 parts of a 70% strength solution of the reaction product of dimethylpyrazole with the isocyanurate of isophorone diisocyanate, in methyl ethyl ketone, were incorporated by stirring, and 200 parts of water were added dropwise over the course of 15 minutes. This gave a stable dispersion having a particle size of 320 nm.

3c) Preparing and Testing Coating Films:

3% by weight of the photoinitiator mixture specified in Example 1c) were mixed into the polyurethane dispersion and the mixture was used to apply coating films with a film thickness of approximately 40 μm to a variety of substrates. The films were aerated at room temperature overnight and then heat-treated at 60° C. for 15 minutes. Subsequently, samples of the heat-treated films were cured as follows:

Experiment A4: radiation curing with 2 UV lamps (80 W/cm) on a conveyor belt at 10 m/min;

Experiment A5: curing in a drying oven at 150° C. for 30 minutes.

After curing as per A4 and A5, the films were physically dry and through-cured (fingernail test). In the Scotch Brite test (50 double strokes) performed as in Example 2d), the loss of gloss was 16 for Experiment A4 and 35 for Experiment A5.

Example 4

Preparing a Dual Cure Polyurethane Acrylate Dispersion with Blocked Isocyanates and OH Groups in One Molecule 4a) Preparing the Prepolymer:

A stirred vessel was charged with 100 parts of an allophanate of hexamethylene diisocyanate and 2-hydroxyethyl acrylate, prepared as in Example 2a), 0.13 part of 2,6-di-tert-butyl-p-cresol, and 0.1 part of hydroquinone monomethyl ether. Following the admixture of 0.02 part of dibutyltin dilaurate and 17.5 parts of 3,5-dimethylpyrazole, the reaction mixture was stirred at 70° C. for 3 hours.

4b) Preparing the Polyurethane Dispersion:

3.3 parts of thioglycolic acid were admixed to the reaction mixture obtained, which was subsequently stirred at 70° C. for 3 hours more and cooled. The NCO content was 3%. Following the addition of 9.6 parts of diethanolamine and 4.4 parts of triethylamine, the mixture was dispersed in water.

4c) Preparing and Testing Coating Films:

The dispersion prepared in 4b) was mixed with 3% by weight of the photoinitiator mixture specified in 1c) and used to prepare films with a thickness of approximately 40 μm on black-colored glass plates, the films all having been aerated at room temperature overnight and then heat-treated at 60° C. for 15 minutes. The film samples were then cured in Experiments A6 to A9 as follows:

Experiment A6: radiation curing on a conveyor belt at 10 m/min;

Experiment A7: curing in a drying oven at 150° C. for 30 minutes;

Experiment A8: curing as in A7 followed by radiation curing as A6;

Experiment A9: admixture of 3% by weight of tert-butyl benzoate, followed by curing as in A7.

The physically dry films obtained after curing had the following pencil hardnesses: A6: <6B; A7: <6B; A8: 3B; A9: 4B. It was found that by admixing peroxides to the dispersion prior to curing them, the hardness of the resulting cured films can be increased further. To assess the scratch resistance, the loss of gloss was measured in the Scotch Brite test (50 double strokes) as specified in Example 2d) for the films resulting from Experiments A6 to A9, with the following results: A6: 47; A7: 16; A8: 29; A9: 27.

Example 5

Preparing a Dual Cure Polyurethane Acrylate Dispersion With Blocked Isocyanates and OH Groups in One Molecule With the Addition of Reactive Diluent.

The procedure of Example 4 was repeated but before the dispersion was processed to films on black-colored glass plates it was admixed not only with 3% by weight of the initiator mixture specified in Example 1c), but also 43% by weight of trimethylolpropane triacrylate as reactive diluent. After aeration overnight and subsequent 15-minute heat treatment at 60° C., the resultant films approximately 40 μm thick were cured as follows:

Experiment A10: 140° C. in a drying oven for 30 minutes, followed by radiation curing with 2 UV lamps (80 w/cm) in air on a conveyor belt at 10 m/min;

Experiment A11: 140° C. in a drying oven for 30 minutes, followed by radiation curing with 2 UV lamps (80 W/cm) under nitrogen on a conveyor belt at 10 m/min;

Experiment A12: radiation curing with 2 UV lamps (80 W/cm) in air on a conveyor belt at 10 m/min, then 140° C. in a drying oven for 30 minutes;

Experiment A13: radiation curing with 2 UV lamps (80 W/cm) under nitrogen on a conveyor belt at 10 m/min, then 140° C. in a drying oven for 30 minutes.

To assess the scratch resistance, the loss of gloss was determined in the Scotch Brite test (50 double strokes) as specified in Example 2d) for the films resulting from Experiments A10 to A13, with the following results:

A10: 94; A11: 8; A12: 34; A13: 13. The addition of reactive diluent, and curing under nitrogen, accordingly contribute to an increase in scratch resistance. The chemical stability of Experiment A13 was determined by way of the temperature above which damage to the surface occurred:

The values found—water >75° C., sulfuric acid 49° C., tree resin >75° C. and keratin 60° C.—demonstrate good resistance properties. The Erichsen flexibility (DIN 53156) is 4.5 mm.

Example 6

Dual Cure Polyurethane Dispersions with a Mixture of Isocyanates

6a) Preparing an Allophanate from Hexamethylene Diisocyanate and 2-Hydroxyethyl Acrylate:

Under nitrogen blanketing, hexamethylene diisocyanate was mixed with 40 mol % (based on the isocyanate) of 2-hydroxyethyl acrylate and the mixture was heated to 80° C. Following the addition of 200 ppm by weight (based on diisocyanate) of N,N,N-trimethyl-N-(2-hydroxypropyl) ammonium 2-ethylhexanoate, the temperature was slowly raised to 120° C. and held at this reaction temperature. When the mixture had an isocyanate content of 13.5% by weight, the reaction was terminated by adding 250 ppm by weight of di(2-ethylhexyl)phosphate (based on diisocyanate). The reaction mixture was then freed from unreacted hexamethylene diisocyanate in a thin-film evaporator at 135° C. and 2.5 mbar. Following distillation, the product had an NCO content of 13.5% by weight and a viscosity of 810 mPas at 23° C.

6b) Preparing the Aqueous Polyurethane Dispersion:

A stirred vessel was charged with 80 parts of the allophanate from Example 6a), 20 parts of the isocyanurate of isophorone diisocyanate (Vestanat® T1890, from Hüls), 12.4 parts of decanediol, 0.13 part of 2,6-di-tert-butyl-p-cresol, 0.1 part of hydroquinone monomethyl ether, and 0.03 part of dibutyltin dilaurate. Then 9.9 parts of hydroxyethyl acrylate were added and the resulting mixture was stirred at 70° C. for 3 hours. Following the addition of 2 parts of thioglycolic acid and 1.1 parts of methanol, stirring was continued at 70° C. for 4 hours and the reaction mixture was then cooled. After 2.3 parts of triethylamine had been added, the resultant product was dispersed in water.

Example 7

Polyurethane Dispersion with Added Reactive Diluent

The procedure of Example 6 was repeated but adding 30 parts of decanediol diacrylate prior to dispersion.

Example 8

Dual Cure Polyurethane Dispersion With Blocked Isocyanate Groups and Hydroxyl Groups In Different Molecules A stirred vessel was charged with 140 parts of the allophanate from Example 6a), 20 parts of the isocyanurate of isophorone diisocyanate (Vestanat® T1890, from Hüls), 17 parts of cyclohexane-1,4-dimethanol, 0.2 part of 2,6-di-tert-butyl-p-cresol, 0.1 part of hydroquinone monomethyl ether, and 0.04 part of dibutyltin dilaurate. Then 9.9 parts of triazole were added and the resulting mixture was stirred at 70° C. for 3 hours. Following the addition of 3 parts of thioglycolic acid and 4 parts of methanol, stirring was continued at 70° C. for 4 hours and the reaction mixture was then cooled. Then 3.8 parts of triethylamine were added, the mixture was stirred at 70° C. for 0.5 hour, 41.6 parts of pentaerythritol triacrylate were added, and the resultant product was dispersed in water.

The dispersions of Example 6–8 were admixed with 4% by weight of a photoinitiator mixture comprising 1-hydroxycyclohexyl phenyl ketone and benzophenone (Irgacure® 500 from Ciba) and applied to metal panels in film thicknesses of approximately 40 μm. The films were flashed off at room temperature overnight and subsequently heat-treated at 60° C. for 15 minutes. The films were then subjected to radiation curing on a conveyor belt with a speed of 10 m/min using two UV lamps (80 W/cm) and to subsequent thermal curing in a drying oven at 150° C. for 30 minutes. The degree of scratching was determined from the loss of gloss (before and after appropriate stressing). The results of the scratch resistance test are shown in Table 1. The chemical resistance was determined by applying a droplet series of the corresponding chemicals to each painted metal panel and heating the panel in a temperature gradient oven. Table 1 indicates the temperatures above which film damage occurred.

TABLE 1

| Dispersion from Ex. No. | Scratch resistance (loss in gloss/%) | Chemical resistance | |
|---|---|---|---|
| 6 | 5.2 | $H_2SO_4$: | 42° C. |
|   |   | Tree resin: | 61° C. |
|   |   | Water: | 65° C. |
| 7 | 3.0 | $H_2SO_4$: | 47° C. |
|   |   | Tree resin: | 55° C. |
|   |   | Water: | 66° C. |
| 8 | 9.0 | $H_2SO_4$: | 46° C. |
|   |   | Tree resin: | 50° C. |
|   |   | Water: | 49° C. |

Example 9

Dual Cure Polyurethane Dispersion with a Mixture of Isocyanates

A stirred vessel was charged with 90 parts of the allophanate from Example 6a), 10 parts of the isocyanurate of isophorone diisocyanate (Vestanat® T1890, from Hüls), 12.42 parts of decanediol, 0.13 part of 2,6-di-tert-butyl-p-cresol, 0.1 part of hydroquinone monomethyl ether, and 0.03 part of dibutyltin dilaurate. Then 5.5 parts of 1,2,4-triazole were added and the resulting mixture was stirred at 70° C. for 3 hours. Following the addition of 2 parts of thioglycolic acid and 5.3 parts of trimethylolpropane, stirring was continued at 70° C. for 4 hours and the reaction mixture was then cooled. After 2.3 parts of triethylamine had been added, the resultant product was dispersed in water. Performance assessment was made by determining the scratch resistance and the chemical resistance, as described above for Examples 6–8. In addition, the hardness of the films was determined in accordance with DIN 50359 and their yellowing by colorimetry in accordance with DIN 6174, 0° value. The results are likewise shown in Table 2. The dispersion of the invention from Example 4 serves for comparison.

TABLE 2

| Dispersion from Ex. No. | Scratch resistance (loss of gloss/%) | Chemical resistance | | Hardness (N/mm²) | Yellowing |
|---|---|---|---|---|---|
| 9 | 2.9 | H₂SO₄: | 44° C. | 146 | 3.5 |
|   |     | Tree resin: | 57° C. |     |     |
|   |     | Water: | 59° C. |     |     |
| 4 | 8.5 | H₂SO₄: | <37° C. | 139 | 6.8 |
|   |     | Tree resin: | <37° C. |     |     |
|   |     | Water: | <37° C. |     |     |

As the results of performance testing show, the already good properties of the inventive dispersion 4 can be improved still further by using a mixture of isocyanates.

Examples 10–12

Example 9 was repeated but replacing the decanediol by another short-chain diol. The results of performance testing are shown in Table 3.

TABLE 3

| Dispersion from Diol Ex. No. | Diol | Scratch resistance (loss of gloss/%) | Chemical resistance | |
|---|---|---|---|---|
| 10 | Hexanediol | 4.4 | H₂SO₄: | 48° C. |
|    |            |     | Tree resin: | 75° C. |
|    |            |     | Water: | 75° C. |
| 11 | HCP¹⁾ | 7.4 | H₂SO₄: | 43° C. |
|    |       |     | Tree resin: | 38° C. |
|    |       |     | Water: | 43° C. |
| 12 | CHDM²⁾ | 4.3 | H₂SO₄: | 42° C. |
|    |        |     | Tree resin: | 71° C. |
|    |        |     | Water: | 61° C. |

[1] Bis(hydroxycyclohexyl)propane
[2] Cyclohexanedimethylol

We claim:

1. A UV- and heat-curable aqueous polyurethane dispersion synthesized essentially from
   a) aliphatic polyisocyanates having an NCO functionality of from 2 to 4.5,
   b) compounds containing at least one isocyanate-reactive group and at least one C=C double bond UV-polymerizable, in the presence of a photoinitiator,
   c) aliphatic compounds containing at least two isocyanate-reactive hydroxyl, mercapto, primary and/or secondary amino groups, having a molecular weight of less than 500 g/mol,
   d) compounds containing at least one isocyanate-reactive group and also at least one carboxyl group or sulfonic acid group,
   e) at least one basic compound for full or partial neutralization of the acid groups of the compounds d),
   f) an isocyanate blocking agent (f1) which converts isocyanate groups into blocked isocyanate groups with an unblocking temperature in the range from 70 to 160° C., or addition of a low molecular mass compound (f2) containing blocked isocyanate groups, and
   g) if desired, a compound other than compounds b) to f) which contains only one isocyanate-reactive group, the reaction products of a) with b) and c), prepared with a stoichiometric excess of NCO groups in relation to hydroxyl groups, having been reacted with compounds d) and e) in amounts sufficient for dispersibility in aqueous medium, blocked isocyanate groups having been introduced into the molecule by reaction with isocyanate blocking agents (f1), or compounds (f2) containing blocked isocyanate groups having been added.

2. A polyurethane dispersion as claimed in claim 1, comprising compounds b) as additive.

3. A polyurethane dispersion as claimed in claim 1, comprising in the polyurethane UV-polymerizable C=C double bonds, hydroxyl groups, and blocked isocyanate groups.

4. A polyurethane dispersion as claimed in claim 1, comprising compounds containing UV-polymerizable C=C double bonds and hydroxyl groups and compounds containing blocked isocyanate groups.

5. A polyurethane dispersion as claimed in claim 1, comprising compounds containing UV-polymerizable C=C double bonds, aliphatic hydrocarbon diols incorporated via isocyanate and having a molecular weight of less than 500 g/mol, free hydroxyl groups, and compounds containing blocked isocyanate groups.

6. A polyurethane dispersion as claimed in claim 1, comprising UV-polymerizable C=C double bonds and hydroxyl groups, synthesized from aliphatic polyisocyanates containing isocyanurate, biuret or allophanate groups.

7. A polyurethane dispersion as claimed in claim 1, wherein component a) comprises at least one compound Va) containing two free isocyanate groups, at least one allophanate group and at least one free-radically polymerizable C=C double bond, a carbonyl group or an oxygen atom in ether function being attached directly to the double bond.

8. A polyurethane dispersion as claimed in claim 7, wherein said compound Va) is selected from compounds of the formula I $$\text{OCN}—R^1—(R^2—C(O)—R^2—R^1)_n\text{NCO} \qquad (I)$$

where
   n is an integer from 1 to 10,
   $R^1$ is a divalent aliphatic or alicyclic $C_2$ to $C_{20}$ hydrocarbon unit or an aromatic $C_6$ to $C_{20}$ hydrocarbon unit,
   $R^2$ in each repeating unit is once —NH— and once $$\overset{|}{C(O)R^3},$$

$R^3$ being a radical derived from an alcohol A by abstracting the hydrogen atom from the alcoholic hydroxyl group, said alcohol A further comprising at least one free-radically polymerizable C=C double bond, and a carbonyl group or an oxygen atom in ether attachment being attached directly to the double bond.

9. A polyurethane dispersion as claimed in claim 7, wherein component a) comprises at least one compound Va) and at least one further, different polyisocynate.

10. A polyurethane dispersion as claimed in claim 1, comprising UV-polymerizable C=C double bonds and hydroxyl groups, synthesized from the allophanates of hexamethylene diisocyanate and hydroxyethyl acrylate and/or mixtures thereof.

11. A polyurethane dispersion as claimed in claim 1, comprising UV-polymerizable C=C double bonds and hydroxyl groups, synthesized from aliphatic polyisocyanates containing isocyanurate, biuret or allophanate groups, as building block a), hydroxyalkyl(meth)acrylates as building block b), aliphatic diols with a molecular weight of less than 500 g/mol as building block c), and monothio or monohydroxy carboxylic acids as building block d).

12. A polyurethane dispersion as claimed in claim 1, comprising added reactive diluents.

13. A polyurethane dispersion as claimed in claim 1, comprising added conventional coatings additives.

14. A polyurethane dispersion as claimed in claim 1, containing UV-polymerizable C=C double bonds and hydroxyl groups, comprising a photoinitiator in an amount of from 0.1 to 5% by weight of its solids content.

15. A polyurethane dispersion as claimed in claim 1, comprising at least one thermal initiator.

16. A polyurethane dispersion as claimed in claim 15, wherein said thermal initiator has a half life at 60° C. of at least one hour.

17. A polyurethane dispersion as claimed in claim 15, wherein said thermal initiator comprises at least one compound having at least one isocyanate-reactive group which even after reaction with a compound containing isocyanate groups is capable of releasing free radicals under heat.

18. A polyurethane dispersion as claimed in claim 15, wherein said thermal initiator comprises benzpinacol or a derivative thereof.

19. The use of a polyurethane dispersion as claimed in claim 1 to coat substrates which can be coated at temperatures of up to 160° C.

20. The use of a polyurethane dispersion as claimed in claim 1 to coat substrates comprising metal, wood, paper, ceramic, glass, plastic, textile, leather, nonwoven, or mineral building materials.

21. The use of a polyurethane dispersion as claimed in claim 1 as or in exterior coatings, preferably of buildings or parts of buildings, road markings, or coatings on vehicles and aircraft.

22. The use of a polyurethane dispersion as claimed in claim 1 as an automotive clearcoat.

* * * * *

UNITED STATES PATENT AND TRADEMARK OFFICE
CERTIFICATE OF CORRECTION

PATENT NO. : 6,747,088 B1  Page 1 of 1
APPLICATION NO. : 10/088520
DATED : June 8, 2004
INVENTOR(S) : Reinhold Schwalm et al.

It is certified that error appears in the above-identified patent and that said Letters Patent is hereby corrected as shown below:

On the title page, Item (54), and col. 1, line 1, should read:

-- (54) AQUEOUS POLYURETHANE DISPERSIONS WHICH CAN BE HARDENED WITH UV-RADIATION AND THERMALLY, AND USE THEREOF --

Column 18, Claim 8, line 10, replace "$\underset{|}{C}(O)R^3$," with -- $\underset{\underset{C(O)R^3}{|}}{\overset{-N-}{|}}$ --.

Signed and Sealed this

Twenty-seventh Day of May, 2008

JON W. DUDAS
*Director of the United States Patent and Trademark Office*